US007853499B2

(12) United States Patent  
Czupek et al.

(10) Patent No.: US 7,853,499 B2  
(45) Date of Patent: Dec. 14, 2010

(54) SYSTEM AND METHOD OF ALLOCATING AN INCOMING ORDER TO STANDING ORDERS

(75) Inventors: Andrew Czupek, New Lenox, IL (US); Bryan T. Durkin, Orland Park, IL (US); Thomas G. McCabe, Chicago, IL (US); Brian M. Wolf, Roselle, IL (US); Donald M. Cuba, Tinley Park, IL (US); Jonathan Kronstein, Elmhurst, IL (US); Troy C. Mathe, Chicago, IL (US)

(73) Assignee: Board of Trade of the City of Chicago, Chicago, IL (US)

( * ) Notice: Subject to any disclaimer, the term of this patent is extended or adjusted under 35 U.S.C. 154(b) by 309 days.

(21) Appl. No.: 11/729,578

(22) Filed: Mar. 29, 2007

(65) Prior Publication Data

US 2008/0243576 A1  Oct. 2, 2008

(51) Int. Cl.  
*G06Q 40/00* (2006.01)
(52) U.S. Cl. .......................................... 705/35; 705/37
(58) Field of Classification Search .................. 705/35, 705/37, 36 R  
See application file for complete search history.

(56) References Cited

U.S. PATENT DOCUMENTS

| | | | |
|---|---|---|---|
| 5,077,665 A | 12/1991 | Silverman et al. | |
| 2002/0099647 A1 | 7/2002 | Howorka et al. | |
| 2003/0225672 A1 | 12/2003 | Hughes et al. | |
| 2003/0225673 A1 | 12/2003 | Hughes et al. | |
| 2004/0059666 A1 | 3/2004 | Waelbroeck et al. | |
| 2004/0111358 A1 | 6/2004 | Lange et al. | |
| 2004/0210511 A1 | 10/2004 | Waelbroeck et al. | |
| 2005/0154660 A1* | 7/2005 | Sturm et al. | 705/35 |
| 2005/0171889 A1 | 8/2005 | Daley et al. | |
| 2005/0171890 A1 | 8/2005 | Daley et al. | |
| 2006/0015448 A1 | 1/2006 | Burkhardt et al. | |
| 2006/0036448 A1 | 2/2006 | Haynie et al. | |
| 2006/0106708 A1 | 5/2006 | Abushaban et al. | |
| 2007/0100732 A1* | 5/2007 | Ibbotson et al. | 705/37 |

OTHER PUBLICATIONS

AtosEuronext MarketSolutions, Functional Definition of Liffe Connect, 2005.*  
International Search Report and Written Opinion in PCT/US08/03538 dated Jun. 12, 2008.  
Atos Euronet Market Solutions, "Functional Definition of Liffe Connect®", Version 9.0, dated 2005, (2 pages).  
Chicago Board of Trade, "How the e-cbot® Market Works," dated 2003, (29 pgs.).

(Continued)

*Primary Examiner*—James A Kramer  
*Assistant Examiner*—Hao Fu  
(74) *Attorney, Agent, or Firm*—Brinks Hofer Gilson & Lione

(57) ABSTRACT

A method of allocating a quantity of an incoming order for a product develops a value that indicates a portion of the incoming order this is to be allocated using a FIFO algorithm and allocates a first portion of the incoming order to standing orders using the FIFO algorithm. The method further allocates a second portion of the incoming order to standing orders using a pro-rata algorithm, wherein the step of allocating the second portion leaves a remaining quantity of the incoming order. In addition, the method allocates the remaining portion to the standing orders using a FIFO algorithm.

12 Claims, 17 Drawing Sheets

OTHER PUBLICATIONS

Functional Definition of Liffe Connect, Liffe Connect Version 9.0, Issued Version 2.0 by Nick Bishop/Angela Edwards.

Functional Definition of Liffe Connect for the Chicago Board of Trade, Liffe Connect Version 7.2, Issued Version 1.0.

Functional Definition of Liffe Connect for the Chicago Board of Trade, Liffe Connect Version 7.1. CBOT, Issued Version 2.6, Dec. 2003.

* cited by examiner

FIG. 1 (prior art)

Incoming order: sell 100 @ 111.01

| Order (buy) | Price | Time Received | Quantity | FIFO Allocation |
|---|---|---|---|---|
| A | 111.03 | 9:30:05 | 30 | 30 |
| B | 111.02 | 9:25:08 | 50 | 50 |
| C | 111.02 | 9:25:26 | 40 | 20 |
| D | 111.02 | 9:25:30 | 10 | 0 |
| E | 111.02 | 9:26:00 | 11 | 0 |
| Total | | | | 100 |

FIG. 2 (prior art)

Incoming order: sell 100 @ 111.01

| Order (buy) | Price | Time Received | Quantity | Proportion | Pro-Rata Allocation |
|---|---|---|---|---|---|
| A | 111.03 | 9:30:05 | 30 | N/A | 30 |
| B | 111.02 | 9:25:08 | 50 | 45% | 32 |
| C | 111.02 | 9:25:26 | 40 | 36% | 25 |
| D | 111.02 | 9:25:30 | 10 | 9% | 6 |
| E | 111.02 | 9:26:00 | 11 | 10% | 7 |
| Total | | | 141 | | 100 |

FIG. 3    (prior art)

Priority: improve market
   Min: 20
   Max: 50
Incoming Order: sell 110 @ 111.01

| Order (buy) | Quantity | Time | Priority | Proportion | Pro-rata | Total |
|---|---|---|---|---|---|---|
| A | 100 | 10:01 | 50 | 33 1/3 | 20 | 70 |
| B | 20 | 10:02 |  | 13 1/3 | 8 | 8 |
| C | 80 | 10:03 |  | 53 1/3 | 32 | 32 |
| Total | 200 |  | 50 |  | 60 | 110 |

FIG. 4    (prior art)

Minimum Allocation Quantity: 2
Incoming order: sell 110 @ 111.01
No Priority

| Order (buy) | Quantity | Time | Proportion (%) | Pro-rata (calculated) | Pro-rata Allocation | Remainder Allocation | Total |
|---|---|---|---|---|---|---|---|
| A | 3 | 10:01 | 1 | 1 | 0 | 2 | 2 |
| B | 3 | 10:02 | 1 | 1 | 0 | 0 | 0 |
| C | 100 | 10:03 | 40 | 44 | 44 |  | 44 |
| D | 128 | 10:04 | 51 | 56 | 56 |  | 56 |
| E | 18 | 10:05 | 7 | 8 | 8 |  | 8 |
| Total | 252 |  |  |  | 108 | 2 | 110 |

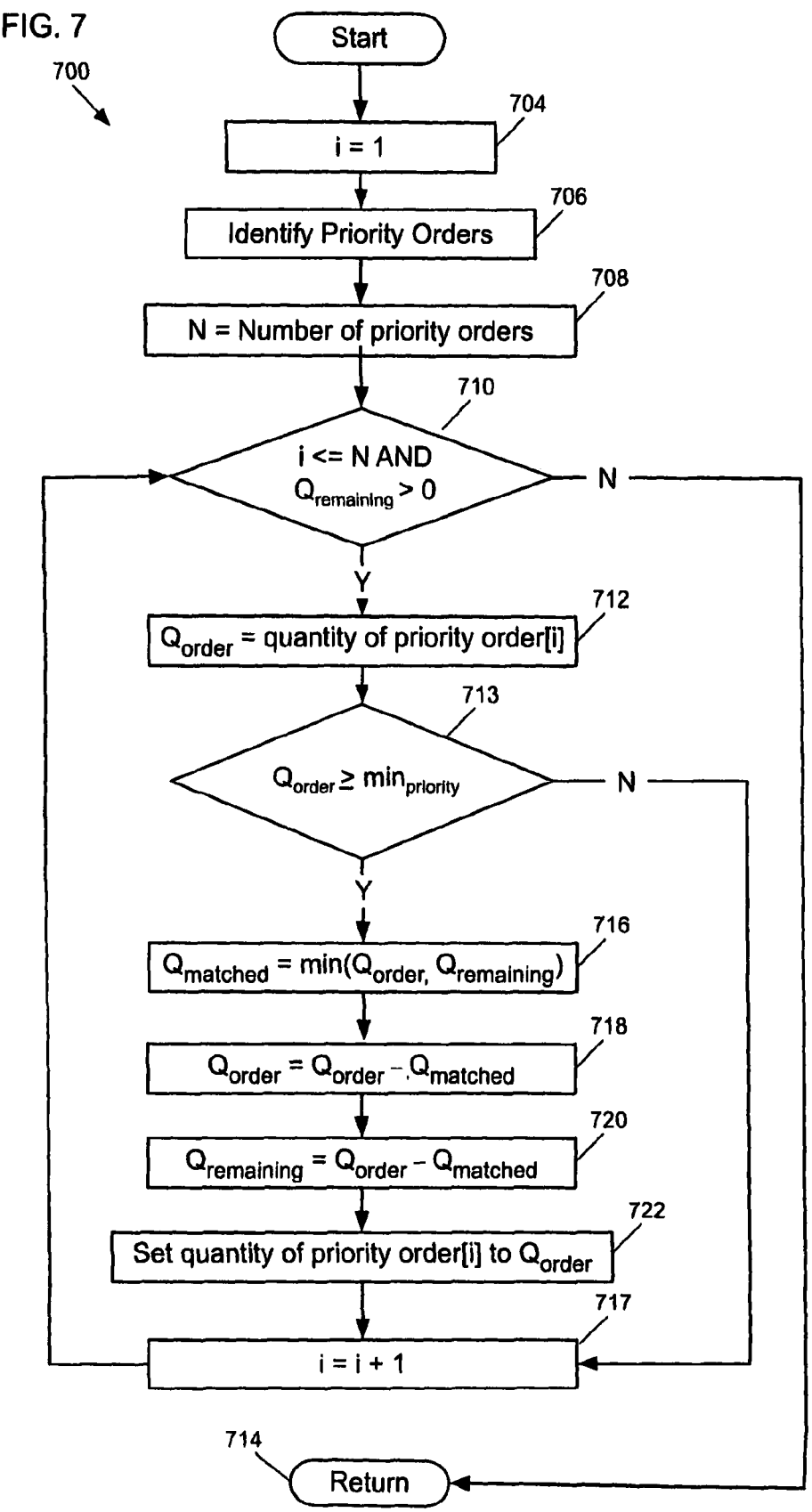

FIG. 12A

Priority:
  Number of orders = 3
  Min = 20
  Max = 50

1200

| Order | Time | Price | Quantity | Priority Status |
|---|---|---|---|---|
| A | 10:01 | 111.01 | 15 | |
| B | 10:02 | 111.01 | 30 | 30 |
| C | 10:03 | 111.01 | 95 | 50 |
| D | 10:04 | 111.01 | 100 | 50 |
| E | 10:05 | 111.01 | 50 | |

Priority:
  Quantity = 120
  Min = 20
  Max = 50

1210

| Order (buy) | Time | Price | Quantity | Priority Status |
|---|---|---|---|---|
| A | 10:01 | 111.02 | 15 | |
| B | 10:02 | 111.02 | 30 | 30 |
| C | 10:03 | 111.02 | 95 | 50 |
| D | 10:04 | 111.01 | 30 | 30 |
| E | 10:05 | 111.01 | 50 | 10 |

Priority:
　Number of orders = 3
　Min = 20
　Max = 50

1300

| Order | Time | Price | Quantity | Priority Status |
|---|---|---|---|---|
| A | 10:00:01 | 111.02 | 15 | |
| B | 10:00:02 | 111.02 | 30 | 30 |
| C | 10:00:03 | 111.02 | 95 | 50 |
| D | 10:00:04 | 111.02 | 100 | 50 |

Priority:
　Number of orders = 3
　Min = 20
　Max = 50

1310

| Order | Time | Price | Quantity | Priority Status |
|---|---|---|---|---|
| E | 10:00:05 | 111.03 | 60 | 50 |
| A | 10:00:01 | 111.02 | 15 | |
| B | 10:00:02 | 111.02 | 25 | 25 |
| C | 10:00:03 | 111.02 | 75 | 50 |
| D | 10:00:04 | 111.02 | 50 | |

Priority:
    Number of orders = 3
    Min = N/A
    Max = N/A

1400

Time = 10:00:04

| Order | Time | Price | Quantity | Priority Status |
|---|---|---|---|---|
| A | 10:00:01 | 111.01 | 50 | 50 |
| B | 10:00:02 | 111.01 | 30 | 30 |
| C | 10:00:03 | 111.01 | 60 | 60 |
| D | 10:00:04 | 111.01 | 100 | |

Time = 10:01:02

1406

| Order | Time | Price | Quantity | Priority Status |
|---|---|---|---|---|
| A | 10:00:01 | 111.01 | 50 | 0 |
| B | 10:00:02 | 111.01 | 30 | 0 |
| C | 10:00:03 | 111.01 | 60 | 0 |
| D | 10:00:04 | 111.01 | 100 | |

FIG. 15

Incoming order: sell 500 @ 111-01
% FIFO: 30%
Priority: 2 orders (best mkt, min=20, max=50)
Rounding: down

1500

| Order (buy) | Quantity | Priority Allocation | Preference Allocation | Order Quantity Remaining | FIFO Allocation (107) | Order Quantity Remaining | Pro-Rata Proportion (%) | Pro-Rata Allocation | Remainder Allocation | Total Allocation |
|---|---|---|---|---|---|---|---|---|---|---|
| A | 80 | 50 | | 30 | 30 | 0 | 0 | 0 | | 80 |
| B | 30 | 30 | | 0 | | 0 | 0 | 0 | | 30 |
| C | 100 | | 42 (10%) | 58 | 58 | 0 | 0 | 0 | | 100 |
| D | 110 | | | 110 | 19 | 91 | 27.74 | 69 | 2 | 90 |
| E | 150 | | 21 (5%) | 129 | | 129 | 39.33 | 98 | | 119 |
| F | 90 | | | 90 | | 90 | 27.44 | 68 | | 68 |
| G | 18 | | | 18 | | 18 | 5.49 | 13 | | 13 |
| Total | 578 | 80 | 63 | 435 | 107 | 328 | 100 | 248 | 2 | 500 |

1502  1504  1506  1508  1510  1512  1514

SYSTEM AND METHOD OF ALLOCATING AN INCOMING ORDER TO STANDING ORDERS

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to trade matching systems and more particularly to determining how a quantity of an order in a market is allocated to other orders in the market.

2. Description of the Background of the Invention

An exchange provides one or more markets for the purchase and sale of various types of products including financial instruments such as stocks, bonds, futures contracts, options, cash, and other similar instruments. Agricultural products and commodities are also examples of products traded on such exchanges. A futures contract is a product that is a contract for the future delivery of another financial instrument such as a quantity of grains, metals, oils, bonds, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates.

Some products on an exchange are traded in an open outcry environment where the exchange provides a location for buyers and sellers to meet and negotiate a price for a quantity of a product. Other products are traded on an electronic trading platform (e.g., an electronic exchange) where traders use software to send an order to the trading platform. The order identifies the product, the quantity of the product the trader wishes to trade, a price at which the trader wishes to trade the product, and a direction of the order (i.e., whether the order is a bid or an offer). Other products are traded in an over-the-counter market (e.g., where products are not listed on an exchange).

A trading host on the trading platform monitors incoming orders received thereby and attempts to identify (i.e., match) one or more previously received orders stored in an order book database, wherein each identified order is contra to the incoming order and has a favorable price relative to the incoming order. In particular, if the incoming order is a bid then the identified order is an offer at a price that is identical to or less than the bid price. Similarly, if the incoming order is an offer at a particular price, the identified order is a bid at a price that is identical to or greater than the offer price.

Upon identification (matching) of a contra order, a minimum of the quantities associated with the identified order and the incoming order is matched and that quantity of each of the identified and incoming orders become two halves of a matched trade that is sent to a clearinghouse. The trading host considers each identified order in this manner until either all of the identified orders have been considered or all of the quantity associated with the incoming order has been matched. If any quantity of the incoming order remains, an entry is created in the order book database and information regarding the incoming order is recorded therein.

Traders access the markets on a trading platform using trading software that receives and displays at least a portion of the order book for a market, enables a trader to provide parameters for an order for the product traded in the market, and transmits the order to the trading platform. The trading software typically includes a graphical user interface to display at least a price and quantity of some of the entries in the order book associated with the market. The number of entries of the order book displayed is generally preconfigured by the trading software, limited by the trading platform, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the trading host identifies multiple orders contra to the incoming order and that have an identical price, wherein the price of the multiple orders is favorable to the price of the incoming order, the trading host allocates the quantity of the incoming order among such identified orders in accordance with prioritization and allocation algorithms as defined in the product specification. A first-in/first-out (FIFO) allocation algorithm considers each identified order sequentially in accordance with when the identified order was received. The quantity of the incoming order is matched to the quantity of the identified order received earliest, then quantities of the next earliest, and so on until the quantity of the incoming order is exhausted. FIG. 1 illustrates how an incoming order to sell 100 lots of a product at a price of 111.01/lot received by the trading host is allocated to standing orders. Table 100 shows orders A-E that the trading host has identified in the order book that are contra to and that have a favorable price compared to the incoming order. Rows of the table 100 show information regarding standing orders A through E in the order book. A column 104 shows the price of each order, a column 106 shows the time each order was received, and a column 108 shows the quantity requested by each order. A column 110 shows the portion of the quantity of the incoming order allocated to each of the standing orders A-E. In particular, the 30 units requested in order A are allocated first because the order A has the most favorable price (111.03). The remaining 70 units of the incoming order are allocated to the orders B-E in accordance with the time they were received because such orders are all at the same price. Therefore, the orders B and C are allocated 50 and 20 units of the remaining 70 units of the incoming order, respectively. Because the quantity of the incoming order is exhausted, the remainder of the standing order C, and all of the standing orders D and E are not allocated any portion of the incoming order.

Some market specifications define the use of a pro-rata allocation algorithm, wherein a quantity of an incoming order is allocated to each of plurality of identified orders proportionally. FIG. 2 illustrates an example of how an incoming order to sell 100 lots of a product with a price of 111.01/lot is allocated among standing orders using the pro-rata allocation algorithm. As with the example of FIG. 1, the trading host has identified orders A-E as being contra (i.e., orders to buy) to the incoming order and having a favorable price. Further, 30 lots of the incoming order are allocated to the 30 lots requested in the order A first because this order has the highest bid price (i.e., is most favorable). Thereafter, the remaining 70 lots are allocated to the orders B-E proportionally because these orders are at the same price. In particular, the trading host calculates the total number of lots requested by the orders B-E (111 units) and calculates a proportion the quantity of each order comprises of the total. Column 202 shows the proportion corresponding to each order. The trading host calculates the portion of the remaining quantity (70) of the incoming order to allocate to each of the orders B-E by multiplying the proportion of the total requested by the order and the quantity remaining. Typically, the trading host rounds the calculated quantity to an integer and whether the trading host rounds up, down, or to a nearest integer is determined by the specification for the market. Any quantity of the incoming order that remains after pro-rata allocation (e.g., because the trading host rounds down the calculated quantity) is allocated to any orders that have an unfilled quantity on a FIFO basis. For example, for the order B, the trading host multiplies the proportion of quantity requested by the order B (i.e., 45%) by the remaining quantity (70) and thus allocates 32 lots of the remaining 70 lots to this order. Column 204 shows the quantity of the incoming order allocated to each of the orders A-E.

Some trading platforms provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some trading platforms cap the quantity of an incoming order that is allocated to a standing order on the basis of a priority for certain markets. In addition, some trading platforms may give a preference to orders submitted by a trader who is designated as a market maker for the product. Other trading platforms may use other criteria to determine whether orders submitted by a particular trader are given a preference. Typically, when the trading host allocates a quantity of an incoming order to a plurality of identified orders at the same price, the trading host allocates a quantity of the incoming order to any orders that have been given priority. The trading host thereafter allocates any remaining quantity of the incoming order to orders submitted by traders designated to have a preference, and then allocates any still remaining quantity of the incoming order using the FIFO or pro-rata algorithms.

FIG. 3 illustrates an example of allocating an incoming order to sell 110 lots of a product where an order that improved the price is given priority. In this example, the order that is given priority must be for a quantity of more than 20 lots and a maximum of 50 lots are to be allocated to on the basis of priority. In addition, suppose that the order A improved the price and is for more than 20 lots. For these reasons the order A is given priority and up to 50 lots of any incoming order is allocated thereto before allocation to other orders at the same price. In particular, when an order for 110 lots is received, 50 lots is allocated to order A and the remaining quantity (60 lots) is allocated proportionally based on the quantity of standing orders that remains after the allocation to the order A based on the priority thereof as described above.

Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). In the example illustrated in FIG. 4, a column 402 shows the results of a pro-rata allocation of an incoming order of 110 lots among orders A-E. A column 404 shows the results of applying a minimum allocation quantity that has a value of 2 to the pro-rata allocation. In this example, the trading host rounds fractional quantities of the pro-rata allocation to the nearest integer. Because orders A and B would be allocated quantities that are less than the value of the minimum allocation quantity, the allocation to each of the orders A and B after applying the minimum allocation quantity is 0. The 2 lots of the incoming order that were not allocated to orders A and B because of applying the minimum allocation quantity are allocated on a FIFO basis and because order A was received earliest, order A is allotted the entire remainder of 2 lots (as shown in a column 406)

Allocation algorithms used by the trading host for a particular market may affect the liquidity of the market. Specifically, some allocation algorithms may encourage traders to submit more orders, where each order is relatively small. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets.

SUMMARY OF THE INVENTION

According to one aspect of the present invention, a method of allocating a quantity of an incoming order comprises the steps of developing a value that indicates a portion of the incoming order that is to be allocated using a FIFO algorithm and allocating a first portion of the incoming order to standing orders using the FIFO algorithm. The method also comprises the step of allocating a second portion of the incoming order to standing orders using a pro-rata algorithm, wherein step of allocating the second portion leaves a remaining quantity of the incoming order. The method comprises the additional step of allocating the remaining quantity of the incoming order to the standing orders using the FIFO algorithm.

In another aspect of the present invention, a method of allocating a quantity of an incoming order to a plurality of standing orders, wherein the standing orders are contra to the incoming order and have identical prices. The method comprises the step of allocating a first portion of the quantity of the incoming order to a first subset of the plurality of standing orders, wherein each order comprising the first subset is designated with a priority. The method comprises the further steps of allocating a second portion of the quantity of the incoming order to a second subset of the plurality of standing orders, wherein a preferred trader submitted each order comprising the second subset. The method comprises the still further steps of allocating a third portion of the quantity of the incoming order to a third subset of standing orders in accordance with when each order comprising the third subset was received. The method comprises the still further step of allocating a fourth portion of the quantity of the incoming order to a fourth subset of the plurality of standing orders proportionally.

In yet another aspect of the present invention, a method of managing priority among standing orders for a product on a trading platform comprises the steps of providing priority to a plurality of discrete standing orders in accordance with a first criterion, wherein a quantity associated with a matched order is allocated to those standing orders that have been provided priority before being allocated to other standing orders at the same price, including standing orders submitted by preferred traders. The method also comprises the step of revoking priority from one of the plurality of discrete standing orders in accordance with a second criterion.

In accordance with another aspect of the present invention, a method of operating a trading host to allocate a quantity of an incoming order comprises the step of providing priority to a plurality of discrete standing orders in accordance with a first criterion. The method comprises the further step of allocating a portion of the quantity of the incoming order to those standing orders that have priority before allocating any quantity of the incoming order to other standing orders that have the same price, including standing orders submitted by preferred traders.

Other aspects and advantages of the present invention will become apparent upon consideration of the following detailed description.

BRIEF DESCRIPTION OF THE DRAWINGS

FIG. 1 shows an example of allocating an incoming order to standing orders using a FIFO algorithm;

FIG. 2 shows an example of allocating an incoming order to standing orders using a pro-rata algorithm;

FIG. 3 shows an example of allocating an incoming order to standing orders in accordance with a priority;

FIG. 4 shows an example of allocating an incoming order to standing orders in accordance with a pro-rata algorithm that imposes a minimum allocation quantity;

FIG. 7 shows an embodiment of how a quantity of an incoming order is allocated to standing orders that have priority;

FIG. 12A shows an example of multiple standing orders having priority;

FIG. 12B shows another example of multiple standing orders having priority;

FIGS. 13A-13B illustrate an example of the priority of standing orders being changed upon receipt of an additional order;

FIGS. 14A-14B show an example of the priority of standing orders being revoked; and FIG. 15 shows an example of allocation of an incoming order to resting orders in accordance with priority, preferences, FIFO allocation, and pro-rata allocation.

DETAILED DESCRIPTION OF THE PREFERRED EMBODIMENTS

Figure 5:
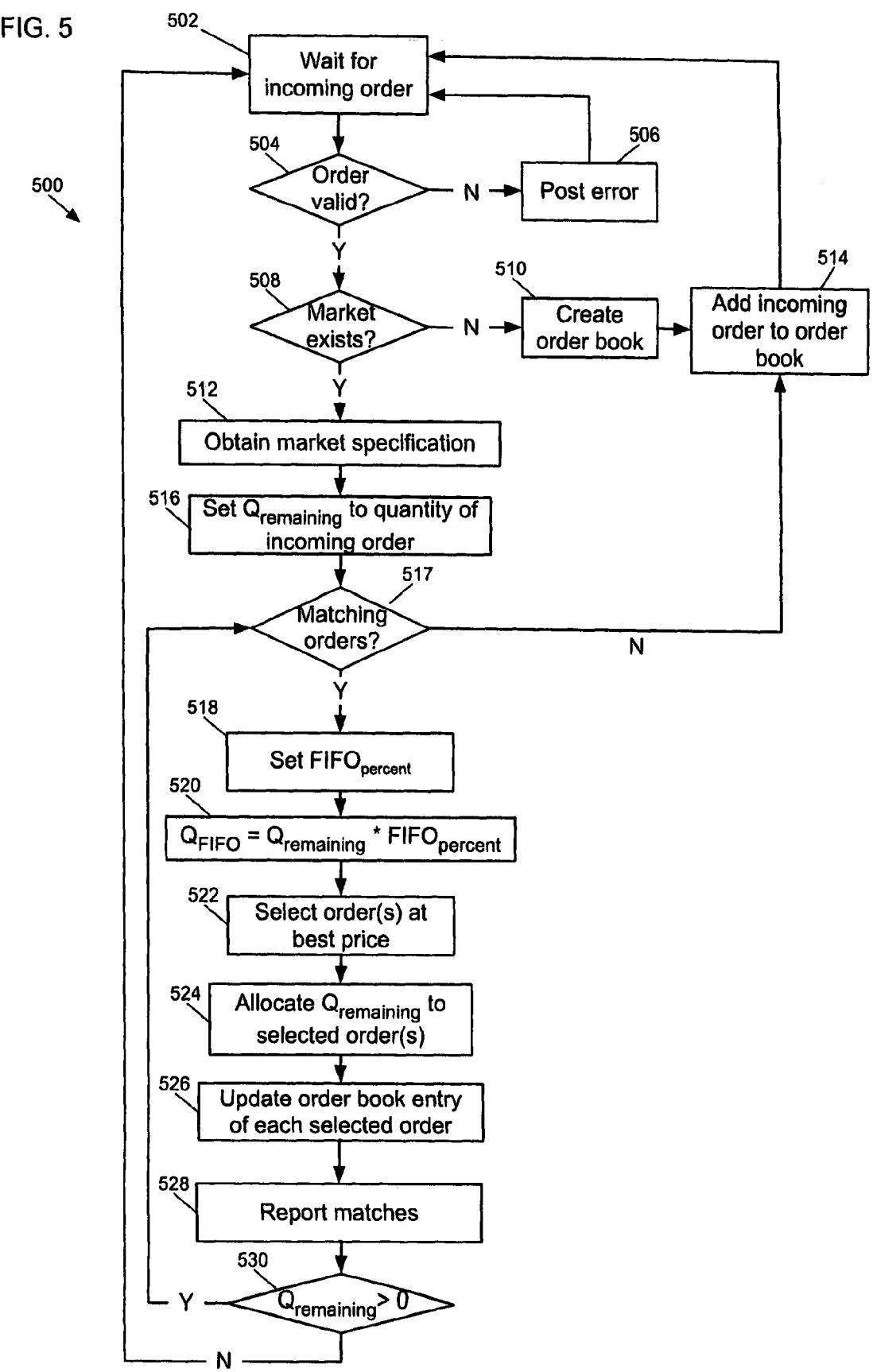
FIG. 5 shows an embodiment of how a trading host processes an incoming order.

FIG. 5 shows a flow diagram 500 of how a trading host may allocate an incoming order to identified orders. At a block 502, the trading host waits to receive an order that is either a bid or an offer to buy or sell, respectively, a quantity of a product. In response to receiving an order, processing proceeds to a block 504, which validates the incoming order. Typically, validation includes verifying that the trader who submitted the incoming order is authorized to trade in the market in which the product is traded and that the incoming order conforms to the specifications for the market in which the product trades. If the order is not valid then processing proceeds to a block 506 that posts the error to the trading software being used by the trader who submitted the order and then processing returns to the block 502 to wait for another incoming order. If the incoming order is valid, a block 508 checks a database maintained by the trading host to determine if an order book (i.e., a market) exists for the incoming order. If the market does not exist, then processing proceeds to a block 510, otherwise processing proceeds to a block 512. The block 510 creates a new order book for the market and a block 514 creates an entry in the newly created order book for the incoming order. The trading host thereafter proceeds to the block 502 to wait for another order to arrive.

The block 512 obtains the specification for the market. Typically, the specification is read from a database or a file structure maintained on computers used by the trading platform. In some embodiments, the database that stores the specification also stores the order book. In other embodiments, separate databases are used to store the specification and the order book. In still other embodiments, the specification is obtained via a network connection to a remote system. A block 516 sets a value $Q_{remaining}$ to the quantity of the product specified in the incoming order.

A block 517 queries the order book to determine if there are any orders therein that are contra to the incoming order and that have a favorable price. If no such orders are identified, the block 514 creates an entry for the incoming order in the order book. If the block 517 identifies at least one order that is contra to the incoming order and that has a favorable price, then a block 518 sets a value $FIFO_{percent}$ that is the percent of the incoming order that should be allocated using a FIFO algorithm. The value $FIFO_{percent}$ may be determined by querying a database or obtained from another system using a private or public network connection. In some markets, the value $FIFO_{percent}$ may be fixed and defined by the market specification. In other markets, the value of $FIFO_{percent}$ may be varied during the course of the trading session in accordance with metrics associated with the market. In other embodiments, the value $FIFO_{percent}$ is determined in accordance with a measure of activity in the market. Specifically, the block 518 uses the criteria of the market specification to determine the value of $FIFO_{percent}$ that should be used. For example, in some embodiments, the block 518 may set a higher value of $FIFO_{percent}$ when there are many orders in the market and a relatively low value of $FIFO_{percent}$ if there are few orders in the market. In other embodiments, the block 518 may use a high value of $FIFO_{percent}$ if the sum of the quantities associated with the orders in the market at the best price is high; otherwise, the block 518 uses a relatively low value of $FIFO_{percent}$. In still other embodiments, the value of $FIFO_{percent}$ is determined dynamically as the number of orders in the market or the quantities associated with the orders varies. Other types of metrics and indicators of market activity that may be used to determine the value of $FIFO_{percent}$ should be apparent to those having skill in the art.

A block 520 determines a value $Q_{FIFO}$, that is the quantity of the incoming order that is to be allocated using a FIFO algorithm, by multiplying the value $Q_{remaining}$ with the value $FIFO_{percent}$. It should be apparent that if the value $FIFO_{percent}$ is 100% then the trading host uses the FIFO algorithm to allocate all of the quantity of the incoming order. In addition, if the value of $\text{FIFO}_{percent}$ is 0% then none of the quantity the incoming order is allocated using the FIFO algorithm and the entire quantity is allocated using the pro-rata algorithms described above or other algorithms designated for the market.

A block 522 identifies and selects all of the orders from the order book that have the best price and that have not had any quantity of the incoming order allocated thereto. A block 524 allocates the quantity of the product specified by the incoming order (i.e., $Q_{remaining}$) and adjusts the value $Q_{remaining}$ in accordance with the quantity of the product allocated thereby. A block 526 updates the order book entry of each order selected by the block 522 to reflect any quantity of the incoming order allocated thereto. For each selected order to which a portion of the incoming order was allocated, a block 528 reports a match between the selected order and the incoming order to the clearinghouse, the trader who submitted the selected order, and the trader who submitted the incoming order. In some embodiments, the block 528 also records the match in a database maintained by the trading platform. A block 530 checks to determine whether the value $Q_{remaining}$ is greater than zero. If the value $Q_{remaining}$ is greater than zero (i.e., the quantity of the incoming order has not been exhausted) then processing proceeds to the block 517 to determine if there are any remaining (i.e., un-allocated) orders that are contra to the incoming order and have a favorable price. Otherwise, processing proceeds to the block 502 to wait for another incoming order.

Figure 6A:
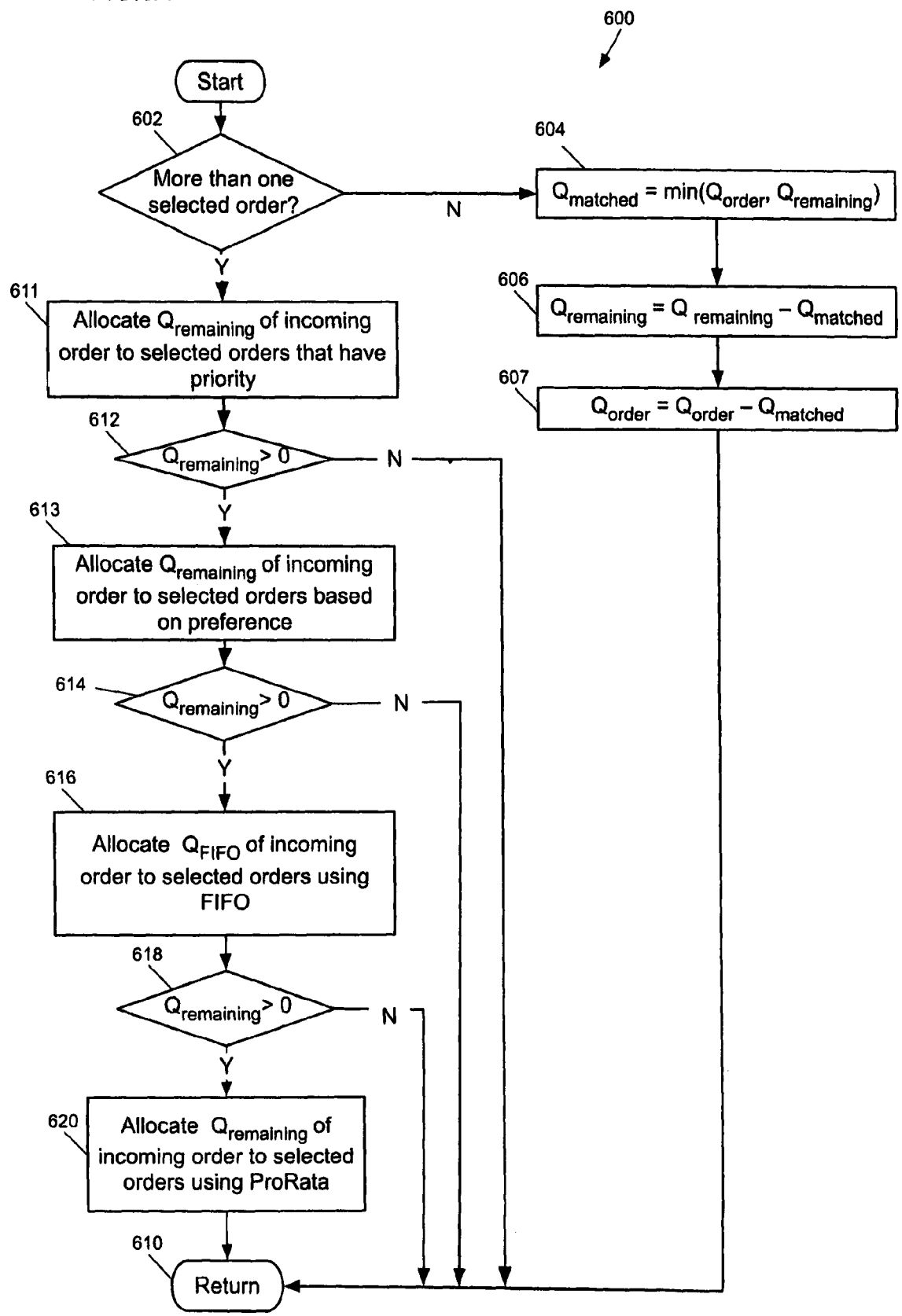
FIG. 6A shows an embodiment of how a quantity of an incoming order is allocated to standing orders.

FIG. 6A shows a flow chart 600 of how the $Q_{remaining}$ quantity of the incoming order is allocated to the order(s) that are selected at the best price by, for example, the block 524 of FIG. 5. A block 602 checks to see if only one order is selected or if multiple orders are selected. If only one order is selected, then a block 604 determines a quantity $Q_{matched}$ of the incoming order that is to be matched to the contra order by calculating the minimum of the quantity of product specified by the selected order ($Q_{order}$) and the quantity of the incoming order that remains to be allocated ($Q_{remaining}$). A block 606 updates the value $Q_{remaining}$ by subtracting the value $Q_{matched}$ therefrom. Similarly, a block 607 updates the quantity of the selected order that remains ($Q_{order}$) by subtracting $Q_{matched}$ therefrom. It should be apparent that after the block 607 one of the values $Q_{matched}$ or $Q_{remaining}$ is zero. Processing continues at block 610 where the allocation to the selected order is complete and other orders may be considered.

A block 611 allocates the quantity of the incoming order ($Q_{remaining}$) to the selected orders in accordance with any priority criteria defined by the market specification for the product. A block 612 checks if any quantity $Q_{remaining}$ of incoming order remains and if so, processing proceeds to a block 613, where the remaining quantity is allocated to standing orders submitted by traders designated to have a preference.

A block 614 determines if there is any quantity of the incoming order remaining to be allocated. If all of the quantity of the incoming order has not been allocated, processing proceeds to a block 616 that allocates a number of lots up to the value $Q_{FIFO}$ of the incoming order to the selected orders using the FIFO algorithm and adjusts the values $Q_{FIFO}$ and $Q_{remaining}$ accordingly. Thereafter, a block 618 checks to see if any quantity of the incoming order remains to be allocated and if so, processing proceeds to a block 620 to allocate the remaining quantity ($Q_{remaining}$) using the pro-rata algorithm. If any of the blocks 612, 614, or 618 determine that the entire quantity of the incoming order has been allocated, processing therefrom proceeds to the block 610.

At the block 610 processing is returned to the block that initiated the allocation processing (e.g., block 524 of FIG. 5).

Figure 6B:
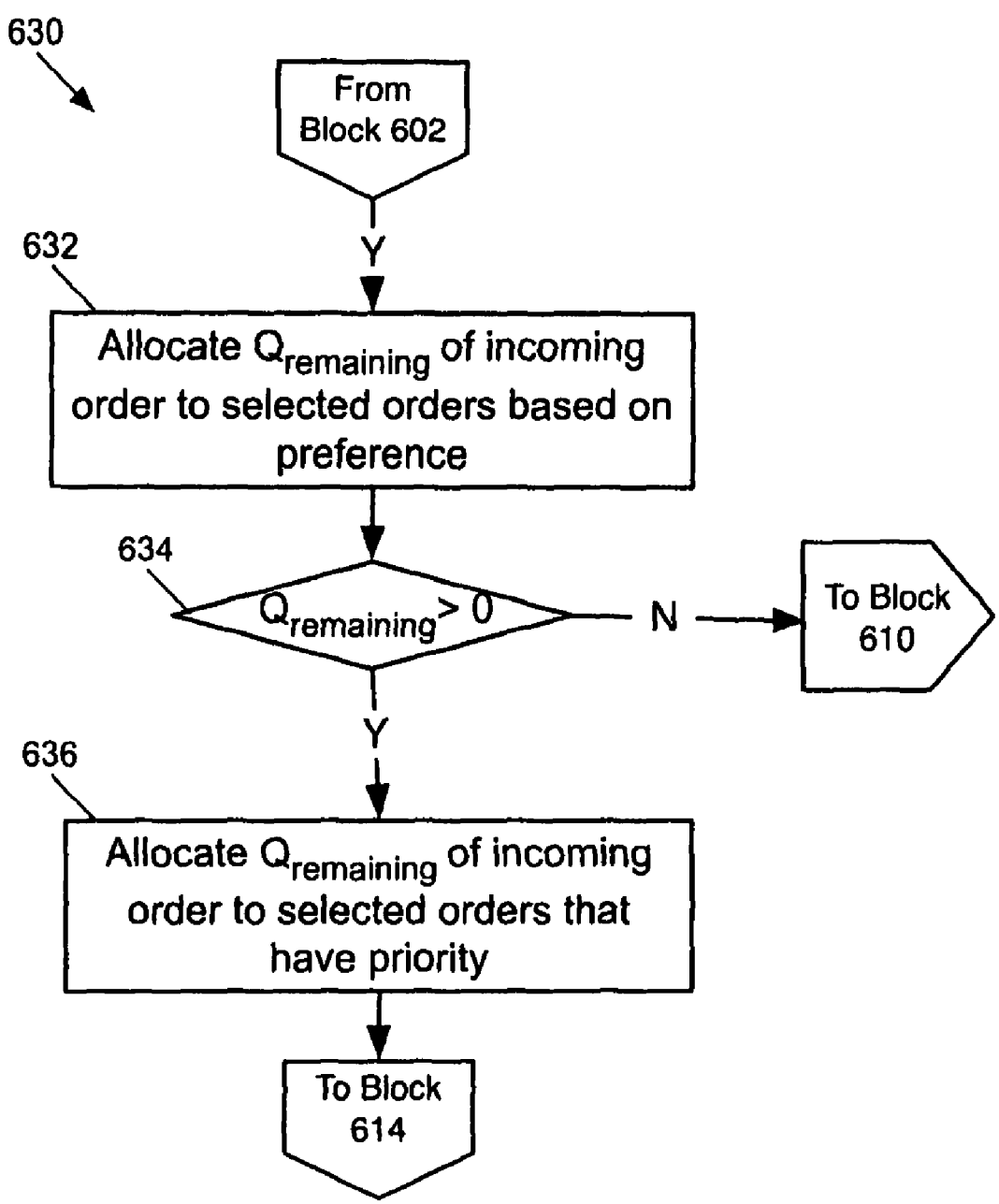
FIG. 6B shows another embodiment of how a quantity of an incoming order may be allocated to standing orders.

FIG. 6B shows a flowchart 630 of an embodiment that is a variant of that shown in FIG. 6A. Specifically, the embodiment shown in FIG. 6B allocates a quantity of an incoming order to orders submitted by preferred traders before allocating any remaining quantity of the incoming order to orders based on priority. In this embodiment, the blocks 611-613 of FIG. 6A are replaced by blocks 632-636. In particular, if the block 602 of FIG. 6A determines that more that one order has been selected then processing proceeds to the block 632, which allocated the quantity $Q_{remaining}$ of the incoming order to those selected orders submitted by preferred traders. The block 634 thereafter branches to the block 636 if any quantity of the incoming order remains; otherwise, the block 634 branches to the block 610 of FIG. 6A. The block 636 allocates any remaining quantity of the incoming order on the basis of priority and proceeds to the block 614 of FIG. 6A.

Figure 6C:
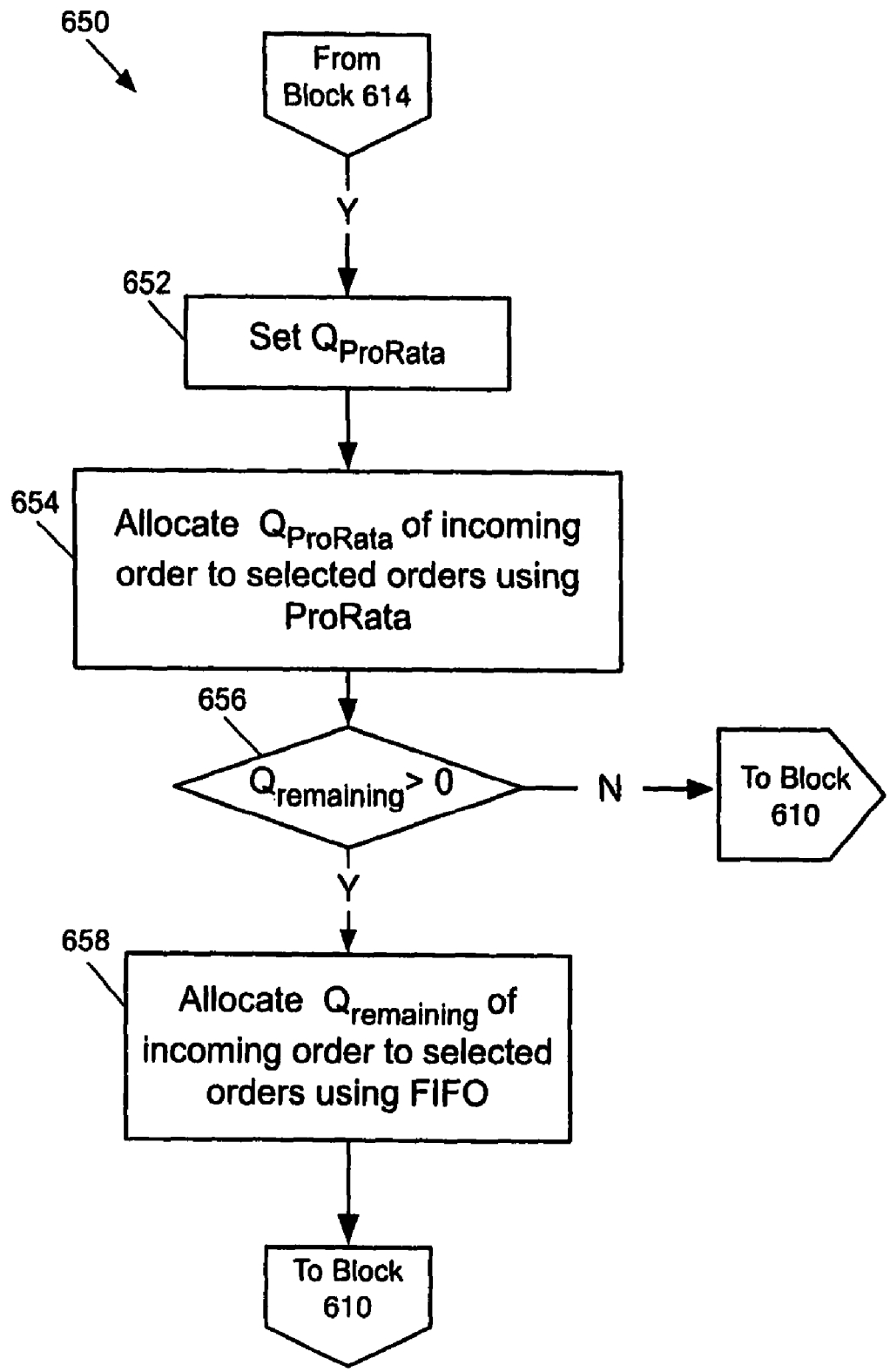
FIG. 6C shows yet another embodiment of how a quantity of an incoming order may be allocated to standing orders.

FIG. 6C shows a flowchart 650 of an embodiment that is another variant of that shown in FIG. 6A. In particular, the embodiment shown in FIG. 6C allocates a remaining quantity of the incoming order using the pro-rata algorithm before allocating a quantity of the incoming order using the FIFO algorithm. In this embodiment, blocks 652-658 are executed instead of the blocks 616-620 shown in FIG. 6A. The block 652 determines a value of $Q_{ProRata}$ that is to be allocated using the pro-rata algorithm. In some embodiments, the value $Q_{ProRata}$ is the difference between the value $Q_{remaining}$ and $Q_{FIFO}$. In other embodiments, the value $Q_{ProRata}$ is developed in a manner similar to how the value $Q_{FIFO}$ is developed and described herein above. The block 654 allocates a quantity $Q_{ProRata}$ of the incoming order to the selected orders using the pro-rata algorithm. The block 656 determines if any quantity of the incoming order remains and, if any quantity does remain, branches to the block 658, which allocates the remaining quantity to the selected orders using the FIFO algorithm and proceeds to the block 610 of FIG. 6A. Alternately, the block 656 branches to block 610 of FIG. 6A if the quantity of the incoming order is exhausted.

FIG. 7 shows a flowchart 700 of an embodiment of how a remaining quantity of the incoming order may be allocated to the selected contra or standing orders that have a priority associated therewith. Specifically, the FIG. 7 shows an embodiment that may be used by the block 611 of FIG. 6A, for example, to allocate the $Q_{remaining}$ quantity (or a portion thereof) of the incoming order to such selected orders. The trading host tracks a quantity of orders within a market during a trading session that has been allocated based on a priority, this value is referred herein as $N_{priority}$. For example, the market specification may define that the first three orders that improve the price during a trading session are to have priority. At the start of the trading session, the value of $N_{priority}$ is set to three by the trading host of the trading platform. The value of $N_{priority}$ is decremented for each order that is allocated a quantity of an incoming order because of priority.

A block 704 sets a value of a counter i to 1. A block 706 identifies any orders among the selected orders (e.g., those selected at the block 522 of FIG. 5) that are given priority and a block 708 sets a value N to the number of such priority orders. A block 710 branches to a block 712 if there are additional priority orders to be considered (i<=N) and if there is a remaining quantity of the incoming order to allocate ($Q_{remaining}$>0). Otherwise, the block 710 branches to a block 714 to return to continue allocating the remaining quantity of the incoming order.

The block 712 set a value $Q_{order}$ to the quantity requested by the $i^{th}$ priority order. In some embodiments, the priority orders are selected sequentially in accordance with the time when each priority order was received. In some embodiments, the priority orders are selected in accordance with trader status. Other methods of selecting the priority orders may be apparent to those with skill in the art. A block 713 determines if the value of $Q_{order}$ is at least a minimum quantity $min_{priority}$ necessary to have a portion of the incoming order allocated thereto in accordance with the priority. The value of $min_{priority}$ is typically defined by the market specification. If the value of $Q_{order}$ is at least $min_{priority}$ then processing proceeds to a block 716; otherwise processing proceeds to the block 717.

The block 716 determines a value $Q_{matched}$ to allocate to the $i^{th}$ priority order by calculating the minimum of the quantity of the $i^{th}$ priority order and the quantity that remains of the incoming order. The value $Q_{matched}$ is subtracted at a block 718 from the value $Q_{order}$ to calculate the quantity of the $i^{th}$ priority order that remains. A block 720 calculates the quantity of the incoming order ($Q_{remaining}$) that remains by subtracting the value of $Q_{matched}$ therefrom. The quantity remaining of the $i^{th}$ priority order is set to $Q_{order}$ at a block 722. The value of the counter i is incremented by the block 717. The processing thereafter continues to the block 710.

Figure 8:
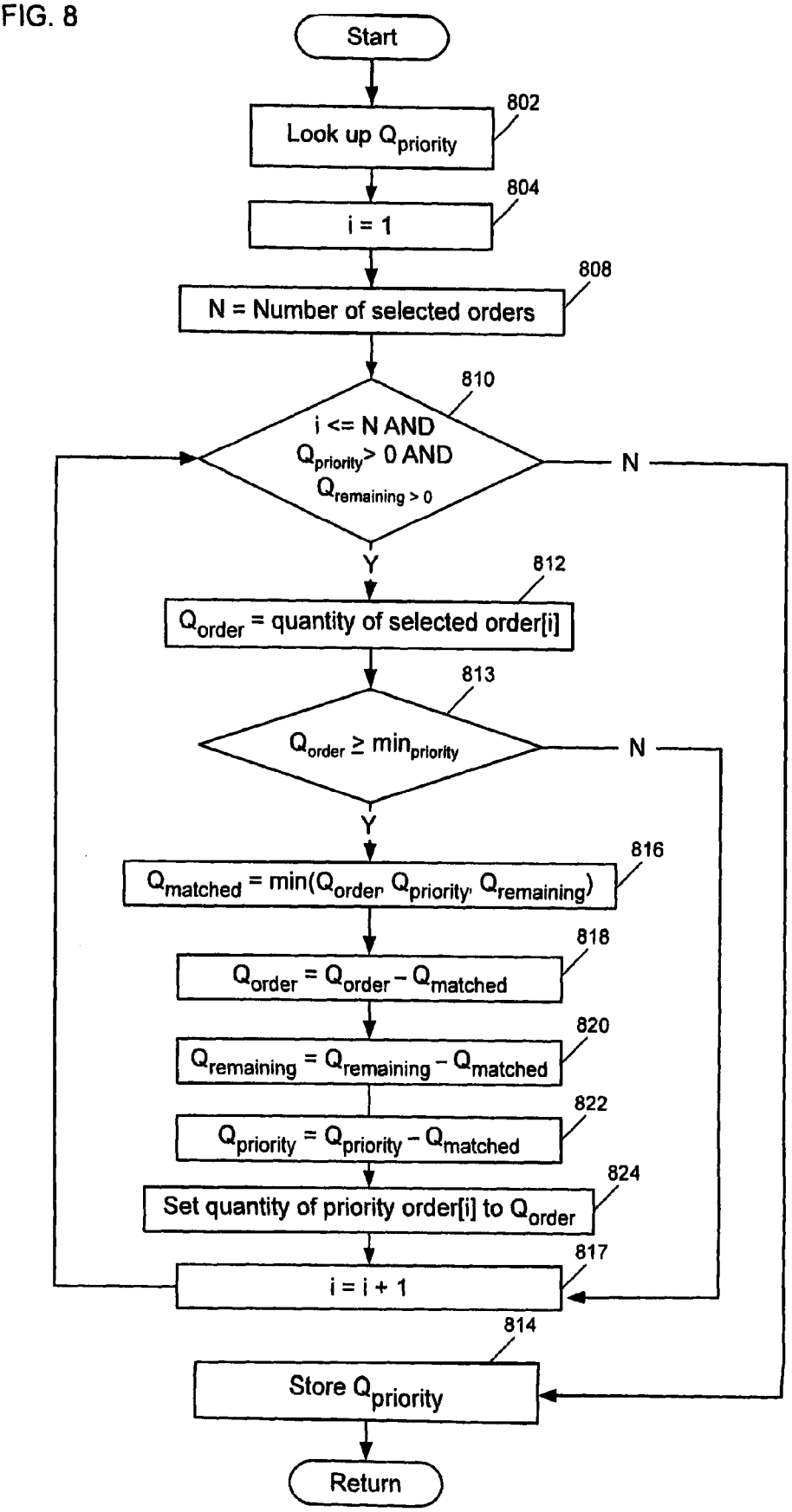
FIG. 8 shows another embodiment of how a quantity of an incoming order is allocated to standing orders that have priority.

FIG. 8 shows another embodiment 800 of how an incoming order may be allocated to selected orders that are given a priority, wherein a maximum of a predetermined quantity ($Q_{priority}$) of the remaining quantity ($Q_{remaining}$) of the incoming order are allocated to selected orders having a priority associated therewith. A block 802 looks up the value of $Q_{priority}$ that may be allocated in accordance with the priority. In some embodiments, the trading host tracks the number of lots within a market and during a trading session that may be allocated based on a priority. The value of $Q_{priority}$ may be stored in a database of the trading host and the value of $Q_{priority}$ is decremented as incoming orders are allocated to orders in accordance with a priority. Typically, the trading host sets the value of $Q_{priority}$ to a predetermined value defined by the trading platform for a particular market. A block 804 initializes the value of a counter i to 1. A block 808 sets the value of a variable N to the number of such orders identified. A block 810 determines if any priority orders remain (i<=N) and if the predetermined quantity of orders have not been allocated in accordance with priority ($Q_{priority}$>0) and if there is any remaining quantity of the incoming order to be allocated ($Q_{remaining}$). If all three conditions are true then the block 810 branches to a block 812; otherwise, the block 810 branches to a block 814. The block 812 sets the value of $Q_{order}$ to the quantity of the $i^{th}$ priority order. In some embodiments, the priority orders are considered in the order in which each priority order was received, so that the first priority order selected by the block 812 is the priority order among the ones identified by the block 806 that was received earliest.

A block 813 compares the value of $Q_{order}$ with the value $min_{priority}$ to determine if the value of $Q_{order}$ is sufficient to be considered for allocation in accordance with priority. If the value of $Q_{order}$ is at least $min_{priority}$ then processing proceeds to a block 816; otherwise processing proceeds to a block 817.

The block 816 calculates a value $Q_{matched}$ that is the amount of the remaining quantity $Q_{remaining}$ to allocate to the $i^{th}$ priority order without exceeding $Q_{priority}$. Blocks 818, 820, and 822 subtract the value $Q_{matched}$ from the values $Q_{order}$, $Q_{remaining}$, and $Q_{priority}$, respectively to reflect the quantity allocated to the $i^{th}$ order. A block 824 sets the quantity of the $i^{th}$ order to $Q_{order}$ and the block 817 thereafter increments the counter i. Processing proceeds to the block 810.

The block 814 stores the quantity of $Q_{priority}$ and allocation of the $Q_{remaining}$ quantity of the incoming order to the selected orders on the basis of priority is completed.

Figure 9:
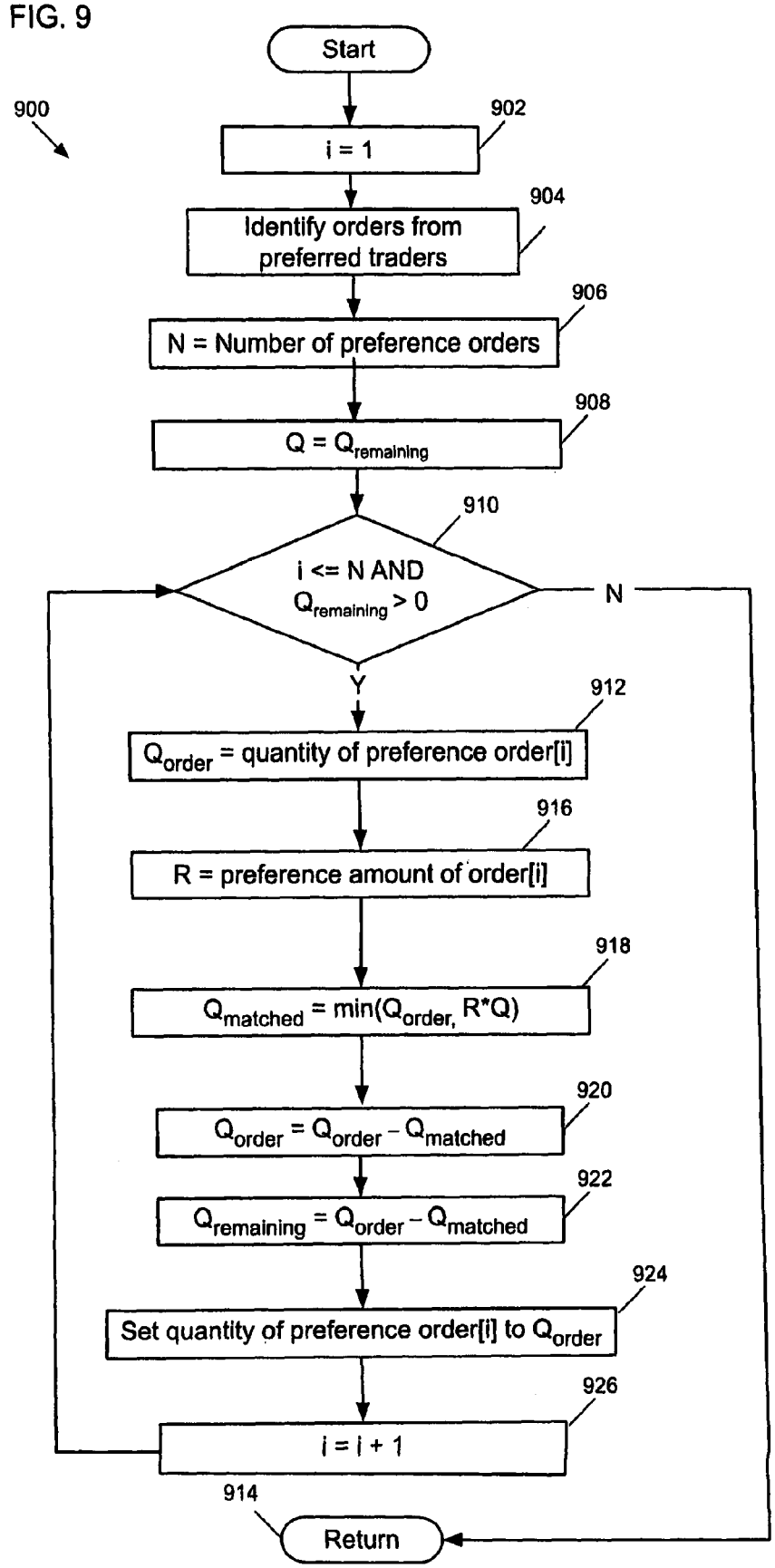
FIG. 9 shows an embodiment of allocating a quantity of an incoming order to orders submitted by traders who are given a preference.

FIG. 9 shows a flowchart 900 that illustrates allocation of the remaining quantity ($Q_{remaining}$) of the incoming order to the orders selected at the block 522 and that have an unfilled quantity associated therewith on the basis of preferences provided to traders. A block 902 sets a value of a counter i to 1. A block 904 identifies orders submitted by traders who are provided a preference. A block 906 sets the value of N to be number of orders identified by the block 904. A block 908 sets a value Q to the value of $Q_{remaining}$. A block 910 tests to determine if orders from preferred traders remain to have a portion of the quantity of the incoming order allocated thereto and if any quantity of the incoming order remains. If orders from preferred traders remain and the quantity of the incoming order remains then processing proceeds to a block 912; otherwise processing proceeds to a block 914 to continue allocating any remaining quantity of the incoming order.

The block 912 sets a value $Q_{order}$ to the quantity of the $i^{th}$ order identified at the block 904. A block 916 identifies a value R that is a predetermined portion of the incoming order to which the preferred trader is entitled and that may vary from trader to trader. In some embodiments, if the preferred trader has submitted multiple orders at the same price, the trading host insures that the total allocation to the preferred trader does not exceed the predetermined portion by adjusting the value R accordingly.

A block 918 determines a value $Q_{matched}$ that is the quantity of the incoming order to be matched to the $i^{th}$ order by calculating the minimum of the quantity of the $i^{th}$ order and the product of the value R and the value Q. The value $Q_{matched}$ calculated at the block 918 is subtracted from the values $Q_{order}$ and $Q_{remaining}$ by blocks 920 and 922, respectively. A block 924 sets the value of the $i^{th}$ order to the value $Q_{order}$ and updates the order database to reflect the match. A block 926 increments the value of the counter i and processing continues at the block 910.

Figure 10:
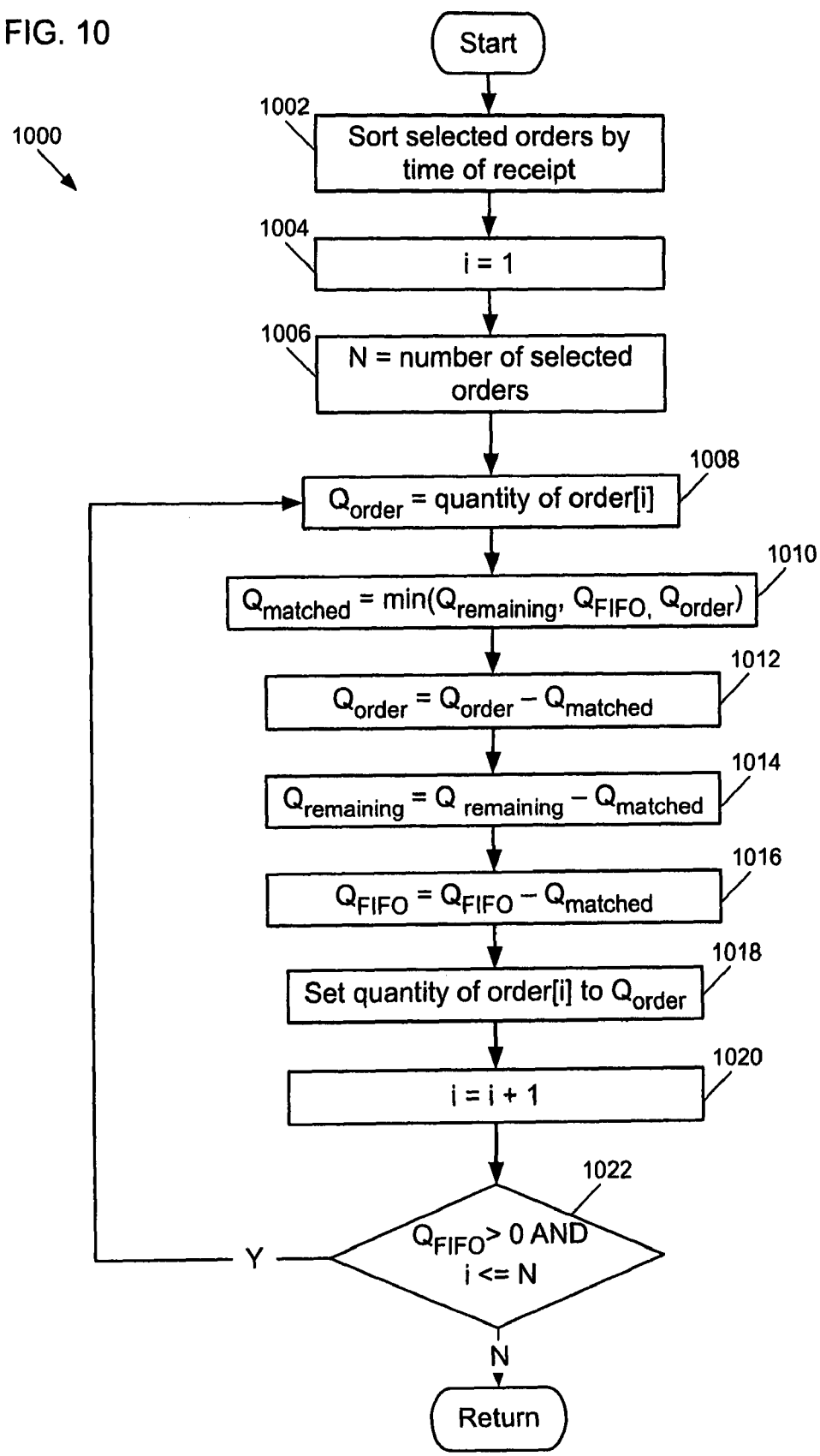
FIG. 10 shows an embodiment of how a quantity of an incoming order is allocated to standing orders using a FIFO algorithm.

FIG. 10 shows a flowchart 1000 of how the quantity $Q_{FIFO}$ of the incoming order is allocated to selected orders using the FIFO algorithm. The block 1002 sorts the selected orders in accordance with the time each order was received. A block 1004 sets a counter i to 1 and a block 1006 sets a value N to be the number of orders that have been selected. A block 1008 sets a value $Q_{order}$ to the quantity of the product specified in $i^{th}$ order of the sorted, selected orders. A block 1010 calculates the quantity of the incoming order to allocate to the $i^{th}$ order using the FIFO algorithm. Specifically, the block 1010 sets a value $Q_{matched}$ to the minimum of the quantity of the incoming order that remains to be allocated ($Q_{remaining}$), the quantity of orders that may be allocated using the FIFO algorithm ($Q_{FIFO}$), and the quantity of the $i^{th}$ order ($Q_{order}$). Blocks 1012, 1014, and 1016 subtract $Q_{matched}$ from $Q_{order}$, $Q_{remaining}$, and $Q_{FIFO}$, respectively, to reflect the quantity of the incoming orders that is allocated to the $i^{th}$ order. A block 1018 sets the quantity that remains of the $i^{th}$ order to $Q_{order}$. A block 1020 increments the value i by one so that the block 1008 selects the next order received for allocation. A block 1022 branches to the block 1008 if any quantity of the incoming order remains that can be allocated using the FIFO algorithm ($Q_{FIFO}$>0) and if another selected order need to be considers (i<=N), otherwise the block 1020 returns to the calling block (e.g., block 616 of FIG. 6A).

Figure 11A:
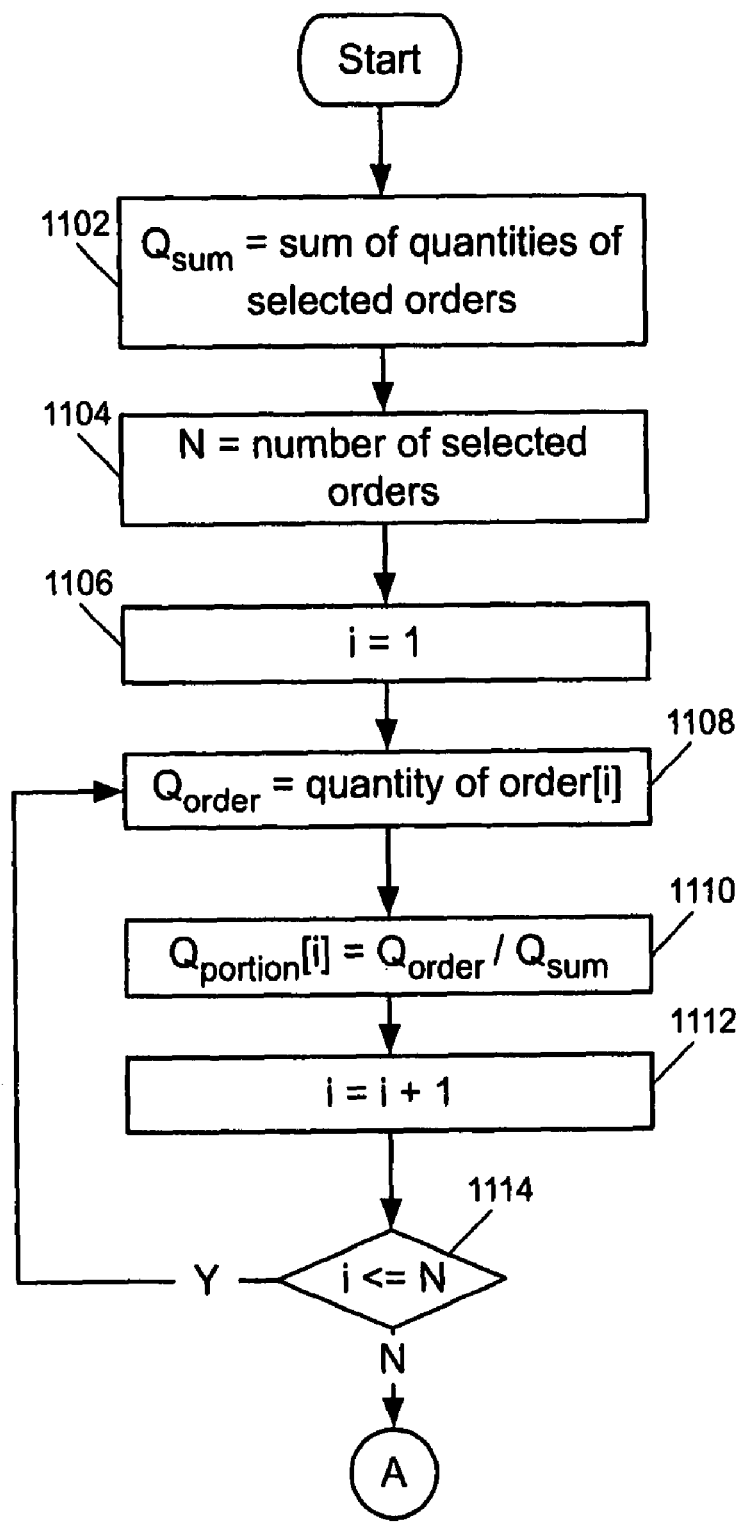
FIGS. 11A-11C show an embodiment of how a quantity of an incoming order is allocated to standing orders using a pro-rata algorithm.
Figure 11B:
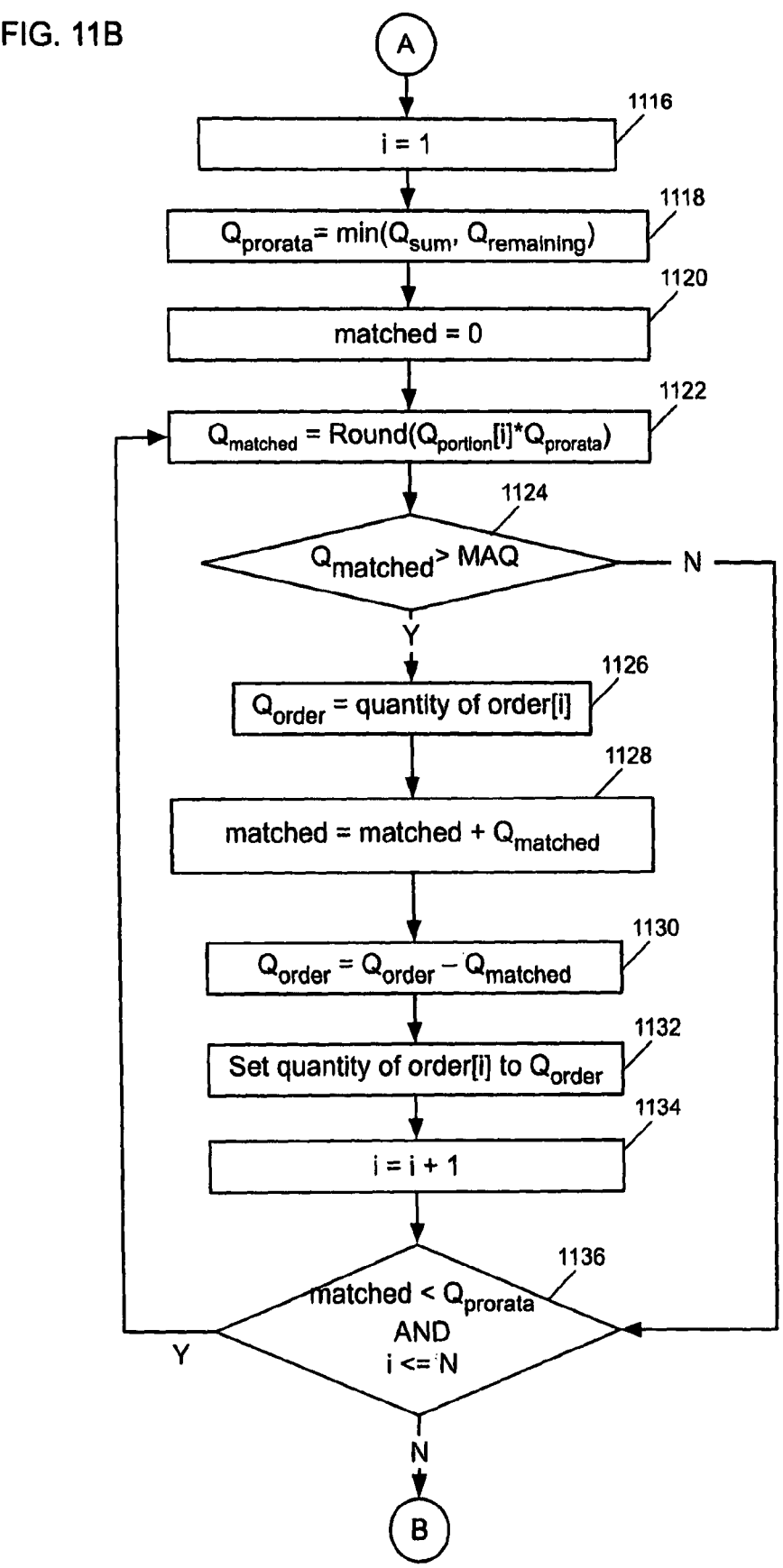
Figure 11C:
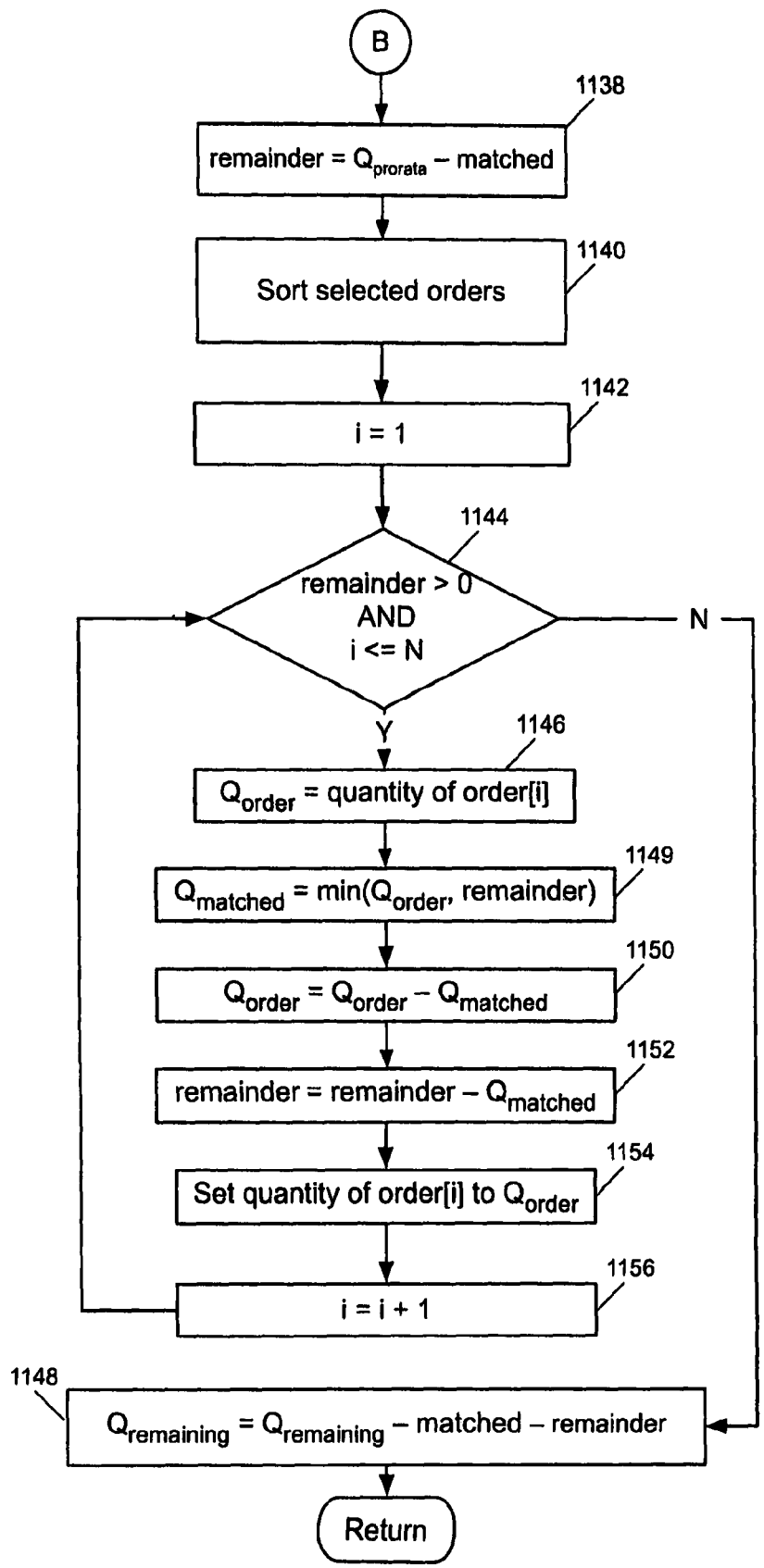

FIGS. 11A-C show an embodiment of allocating the quantity $Q_{remaining}$ of an incoming order to the selected orders in accordance with the pro-rata algorithm and which is representative of the processing that may be undertaken by the block 620 of FIG. 6A. A block 1102 calculates a value $Q_{sum}$ that is a sum of the quantities of the selected orders and a block 1104 determines the value N that is the number of selected orders. A block 1106 sets a value of a counter i to 1. A block 1108 determines the quantity of the $i^{th}$ selected order and a block 1110 calculates a value $Q_{portion}$ that is the proportion that the quantity of the $i^{th}$ selected order comprises of the total of the quantities of the selected orders. A block 1112 increments the counter i. A block 1114 compares the value of i with the number of selected orders (N) and, if the value of i is less than the value of N, branches to the block 1108. Otherwise, the block 1114 proceeds to a block 1116 of FIG. 11B, which resets the value of the counter i to 1. Continuing with FIG. 11B, a block 1118 calculates a value $Q_{prorata}$ that is the minimum of the total of the quantities of the selected orders ($Q_{sum}$) and the value $Q_{remaining}$. A block 1120 sets the value of matched to 0. A block 1122 calculates a value $Q_{matched}$ that is the quantity of the incoming order to be allocated to the $i^{th}$ selected order by multiplying the proportion of the $i^{th}$ selected order ($Q_{portion}[i]$) and the value $Q_{prorata}$. In some embodiments, the block 1122 rounds the product of $Q_{potion}[i]$ and $Q_{prorata}$ down to the nearest integer by truncating any fraction portion thereof. In other embodiments the block 1122 rounds the product up to the next higher integer if the fractional portion of the product is greater than 0.5 and down to the preceding lower integer otherwise. Other rounding schemes that may be used are known to those skilled in the art. A block 1124 compares the value $Q_{matched}$ calculated at the block 1122 with a value of the minimum allocation quantity (MAQ) that is defined for the market. Typically, the value of the minimum allocation quantity is defined in the specification for the market. If the value $Q_{matched}$ is greater than the value of the minimum allocation quantity then a block 1126 sets a value $Q_{order}$ to the quantity associated with the $i^{th}$ order. Thereafter, a block 1128 adds the value $Q_{matched}$ to the value matched. A block 1130 subtracts the value $Q_{matched}$ from the value $Q_{order}$ and a block 1132 sets the quantity of the $i^{th}$ order to the value $Q_{order}$. A block 1134 increments the value of the counter i. A block 1136 determines if the value matched is less than the value $Q_{prorata}$ and if the value of the counter i is less than or equal to the number of selected orders (N). If both comparisons made at the block 1136 are true then the block 1136 branches to the block 1122 to continue allocating the incoming order to the remaining selected orders. The block 1124 branches to a block 1136 if the value $Q_{matched}$ is less than the value of the minimum allocation quantity.

If the comparisons undertaken by the block 1136 are not true then processing proceeds to a block 1138 of FIG. 11C to allocate any quantity of the incoming order that was not allocated. The block 1138 calculates a value remainder that is the difference between the quantity that could have been allocated using the prorata algorithm and the quantity that actually was allocated by the blocks 1122-1136. The value remainder represents the quantities not allocated because of rounding or because a value $Q_{matched}$ was less than the value of the minimum allocation quantity. A block 1140 sorts the selected orders. In some embodiments, the block 1140 sorts the selected orders in accordance with the time when each order was received. In other embodiments, the block 1140 sorts the selected orders in accordance with the portion of the sum of the quantities of all of the selected orders represented by the quantity of each selected order. A block 1142 resets the value of the counter i to 1. A block 1144 branches to a block 1146 if any remainder quantity needs to be allocated (i.e., that the value remainder is greater than 0) and if all of the selected orders have been considered (i.e., that value of the counter i is less than or equal to the value N). Otherwise, the block 1144 branches to a block 1148. The block 1146 sets the value of $Q_{order}$ to any remaining quantity of the $i^{th}$ order (as sorted by the block 1140). A block 1149 calculates a value $Q_{matched}$ that is a minimum of the values $Q_{order}$ and remainder. A block 1150 subtracts the value $Q_{matched}$ from the value $Q_{order}$ and sets the value of $Q_{order}$ to the result. A block 1152 sets the value remainder to the result of subtracting the value $Q_{matched}$ therefrom. A block 1154 set the quantity associated with $i^{th}$ order to the value $Q_{order}$. A block 1156 increments the value of the counter i and thereafter proceeds to the block 1144.

The block 1148 calculates any remaining quantity of the incoming order after the allocation undertaken by blocks 1102 through 1156. Specifically, the value $Q_{remaining}$ is decremented by the value matched and the value remainder. Thereafter, processing resumes with the block following the block that initiated the pro-rata allocation (e.g., the block 620).

Some embodiments allow more than one order to have priority. FIG. 12A shows a table 1200 of exemplary standing orders in a market. For this example, the first three orders that improve the market and that request an order quantity of at least 20 lots are given priority. In addition, the maximum quantity of an incoming order that is allocated to each order based on the priority is 50. A Column 1202 shows the time of receipt of each order, and columns 1204 and 1206 show the price and quantity requested by each order, respectively. As shown in the column 1204, each of the orders has an identical price and this example assumes this is the best price for the market. A column 1208 shows a quantity of each order filled based on priority. Although the earliest received order is order A, no portion of order A may be filled based on priority because this order does not meet the minimum quantity criterion of 20 lots. Orders B-D are given priority because these are the first three orders to improve the market and that meet the minimum quantity criterion. Furthermore, up to 50 lots of the orders C and D may be allocated based on priority.

FIG. 12B shows a table 1210 that depicts how a market may provide priority to standing orders that improve the market based on a predefined quantity. In the example shown in FIG. 12B, up to 120 lots belonging to standing bid orders that meet a minimum quantity requirement of 20 lots are provided priority up to a maximum of 50 lots per order. A column 1210 shows when each order A-E was received, a column 1212 shows the price of the orders A-E and a column 1214 shows the quantity requested by each of the orders A-E. A column 1216 shows how the quantity available for priority is distributed among the orders A-E. Specifically, order A does not receive any priority because order A does not meet the minimum requirement. Thirty lots of order B may be allocated on the basis of priority. In addition, 50 lots of the 95 lots requested by order C may be allocated on the basis of priority because 50 is the maximum. All of the 30 lots requested by order D may be allocated on a priority basis. Of the 50 lots requested by order E, only 10 lots may be allocated based on priority because the quantity available for priority is exhausted. Note, if the trading host receives a matching incoming (sell) order having a quantity of at least 95 lots, the trading host allocates 30 lots of the incoming order to order B, 50 lots to order C, and then 15 lots to order A.

Some embodiments allow orders that are provided priority when such orders improved the market to retain priority even if the market is improved further by subsequent orders. FIG. 13A shows a table 1300 of representative standing orders A-D to sell a product in a market. In this example, as many as three orders that improve the market and are each for at least a minimum quantity of 20 lots are provided priority and the maximum quantity of each order that may be filled based on priority is 50 lots. A column 1302 shows the time of receipt of each order. Columns 1304 and 1306 show the price and quantities of each order. As is apparent in FIG. 13A, all of the orders A-D are at a price that is identical. A column 1306 shows the quantity of each of the orders A-D that is eligible to be allocated based on priority if these orders were the first to improve the market. Specifically, order A does not meet the minimum quantity requirements to be provided priority. Orders B-D are provided priority. FIG. 13B illustrates a table 1310 showing the status of the standing orders A-D of the table 1300 after an order E is received that further improves the price. Because the order E improves the price and meets the minimum quantity requirements for having priority, order E is provided priority. Further, orders B and C retain the priority previously provided because the market in this example may have as many as three standing orders that have priority. For the same reason, the priority provided to order D before the receipt of order E may be revoked. In some markets, as many as a predetermined number of orders at the same price are given priority. In other markets, a predetermined number of orders that are given priority may have different prices. A column 1312 shows the quantities of the orders B, C, and E that may be filled based on priority. Typically, although orders B and C retain priority, the trading host first fills standing orders that are at a better price than orders B and C before filling such orders (even if such standing order do not have priority).

Some embodiments provide a priority to an order for a limited period of time. After the period of time expires, the priority provided to the order is revoked. In other embodiments, priority provided to all orders is revoked after a period of time that begins when an initial order is given priority elapses. The period of time may be fixed for the market (e.g., 30 seconds, 10 milliseconds) or may be dynamic and adjusted in accordance with market activity. Furthermore, the period of time may vary by market and in some markets, the period of time is a sub-second interval. FIGS. 14A and 14B illustrate the aging of order priorities. Specifically, FIG. 14A shows a table 1400 of standing orders A-D in a market at a time 10:00:04, wherein orders A-C were received at 10:00:01, 10:00:02, and 10:00:03, respectively, and have been provided priority (as shown in column 1402). In this example, the market depicted in FIGS. 14A and 14B does not require orders to have a minimum quantity to receive priority nor does the market cap the quantity of the order that may be filled in accordance with a priority. FIG. 14B shows a table 1404 that illustrates the status of the standing orders A-D at a time 10:01:02 and, as shown in column 1406, the priority provided to orders A-D has been revoked because this market only provides a priority for 1 minute.

FIG. 15 illustrates a table 1500 of standing orders A-G in an exemplary market. In this example, assume that the orders A-G are sorted by the time each order was received and that order A was received first. Also, assume that order A improved the market. The market uses a value of $FIFO_{percent}$ of 30%, provides priority to the 2 orders that improve the market and have a minimum order quantity of 20, and caps the quantity of an order that may be allocated on the basis of the priority to 50. The market further rounds down allocations based on the use of a pro-rata algorithm. Furthermore, this market provides a preference to the traders who submitted orders C and E. Specifically, the trader who submitted order C is entitled to be allocated up to 10% of a quantity of the incoming order that remains after priority allocation. Similarly, the trader who submitted order E receives up to 5% of the quantity of the incoming order that remains after allocation of the incoming order to order that have priority. Assume that the trading host receives an order to sell 500 lots at 111.01 in the market and that orders A-G are orders to buy. Furthermore, assume that each of orders A-G has an identical bid price that is better than or equal to 111.01. As shown in a column 1502, orders A and B are allocated 50 and 30 lots of the incoming order because these orders have been given priority. Even though the quantity requested by order A is 80, order A is allocated 50 lots because the market caps priority allocations to 50. The quantity of the incoming order that remains after the priority allocation is 420. Therefore, orders C and E are allocated 42 lots and 21 lots, respectively, because of the 10% and 5% allocation provided to the traders who submitted these orders (shown in column 1504).

The quantity of the incoming order remaining after the preferencing allocation is 357 lots. Of this 30% (i.e., 107 lots) is allocated using the FIFO algorithm. The allocation to each order using the FIFO algorithm is shown in a column 1506. The quantity of the standing orders that remains to be filled is 328 as shown in a column 1508 and the quantity of the incoming that remains to be allocated is 250 lots. A column 1510 shows the 328 lots represented by the quantity of each order. A column 1512 shows the allocation of the remaining 250 lots in accordance with the proportion. Because the pro-rata algorithm used by this market rounds down fractional allocation quantities, 2 lots remain to be allocated and these are allocated on a FIFO basis to order D as shown in a column 1514.

Although the embodiments and examples described above illustrate the use of a $FIFO_{percent}$ value to determine the number of contracts that are allocated using the FIFO algorithm, it should be apparent that a $ProRata_{percent}$ value may be used instead to determine the number of contracts that are allocated using the pro-rata algorithm. Furthermore, an incoming order may be allocated in accordance with the pro-rata algorithm first and then any quantity that remains thereafter may be allocated using the FIFO algorithm. In addition the incoming order may be allocated to standing contra orders using a combination of FIFO, pro-rata, multiple priority and multiple preferencing algorithms. Such algorithms may be combined with other allocation and order selection algorithms that may be apparent to those with skill in the art.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A trading host that allocates a quantity of an incoming order for a product, the trading host comprising computer hardware and program code, wherein the program code, when executed, causes the trading host to perform the steps of:

receiving the incoming order over a network;

developing a value that indicates a portion of the incoming order that is to be allocated using a FIFO algorithm, wherein the value is greater than 0 percent and less than 100 percent;

allocating a first portion of the incoming order to standing orders using the FIFO algorithm in accordance with the value;

allocating a second portion of the incoming order to standing orders using a pro-rata algorithm, the step of allocating the second portion leaves a remaining quantity of the incoming order;

allocating the remaining quantity to the standing orders using a FIFO algorithm; and wherein the value changes during a trading session in accordance with a metric associated with market activity.

2. The trading host of claim 1, wherein the developing step comprises the step of establishing the value in accordance with market activity.

3. The trading host of claim 1, wherein the developing step comprises the step of establishing the value in accordance with market activity.

4. The trading host of claim 1, wherein the step of allocating the second portion comprises the step of rounding an amount allocated to a standing order.

5. The trading host of claim 4, wherein the step of rounding the amount comprises the further step of rounding to a next higher integer.

6. The trading host of claim 4, wherein the step of rounding the amount comprises the further step of truncating a fractional amount.

7. The trading host of claim 1, wherein the product is an option.

8. The trading host of claim 1, wherein the product is an option.

9. The trading host of claim 8, wherein the option is on a futures contact.

10. The trading host of claim 1, wherein the product is traded in an over-the-counter market.

11. The trading host of claim 1, wherein the method comprises the further step of recording an unallocated quantity of the incoming order in a database.

12. The trading host of claim 1, wherein the trading host comprises an electronic exchange.

* * * * *